United States Patent [19]

Nakamura et al.

[11] Patent Number: 4,575,138
[45] Date of Patent: Mar. 11, 1986

[54] DOOR LATCHING DEVICE

[75] Inventors: Hitoshi Nakamura; Ryoji Shimura, both of Yokohama, Japan

[73] Assignee: Ohi Seisakusho Co., Ltd., Yokohama, Japan

[21] Appl. No.: 534,248

[22] Filed: Sep. 21, 1983

[30] Foreign Application Priority Data

| Sep. 22, 1982 [JP] | Japan | 57-165338 |
| Sep. 22, 1982 [JP] | Japan | 57-165334 |
| Sep. 22, 1982 [JP] | Japan | 57-165335 |
| Sep. 22, 1982 [JP] | Japan | 57-165336 |
| Sep. 22, 1982 [JP] | Japan | 57-165337 |

[51] Int. Cl.$^4$ .............................................. E05C 3/26
[52] U.S. Cl. ..................................... 292/216; 49/503; 292/337; 292/DIG. 27
[58] Field of Search ............... 292/216, 280, DIG. 27, 292/DIG. 23, DIG. 65, 337; 49/502, 503

[56] References Cited

U.S. PATENT DOCUMENTS

| 3,415,559 | 12/1968 | Seavons | 292/216 |
| 3,528,694 | 9/1970 | Harley | 292/216 |
| 3,592,504 | 7/1971 | Sandor | 292/216 X |
| 3,844,593 | 10/1974 | Slattery | 292/216 X |
| 4,045,064 | 8/1977 | Okada | 292/DIG. 27 X |
| 4,487,441 | 12/1984 | Miyamoto et al. | 292/216 X |
| 4,492,395 | 1/1985 | Yamada | 292/216 |

FOREIGN PATENT DOCUMENTS 57-33870 2/1982 Japan.

Primary Examiner—Kenneth J. Dorner
Assistant Examiner—Russell W. Illich
Attorney, Agent, or Firm—Schwartz, Jeffery, Schwaab, Mack, Blumenthal & Evans

[57] ABSTRACT

Disclosed herein is an improved door latching device which is generally composed of two sections which are hingedly connected to each other, one section including a latch plate and a first control mechanism, the first control mechanism being capable of causing the latch plate to assume a non-latched condition, a half-latched condition or a full-latched condition, the other section including a second control mechanism and a third control mechanism, the second control mechanism being capable of transmitting the movement of the door inside handle to the first control mechanism, the third control mechanism being capable of disabling the second control mechanism from transmitting the movement from the door inside handle to the first control mechanism. With the hinge portion, the two sections are openable to assume a substantially flat configuration thereby to facilitate the mounting of parts to the casings of them.

19 Claims, 19 Drawing Figures

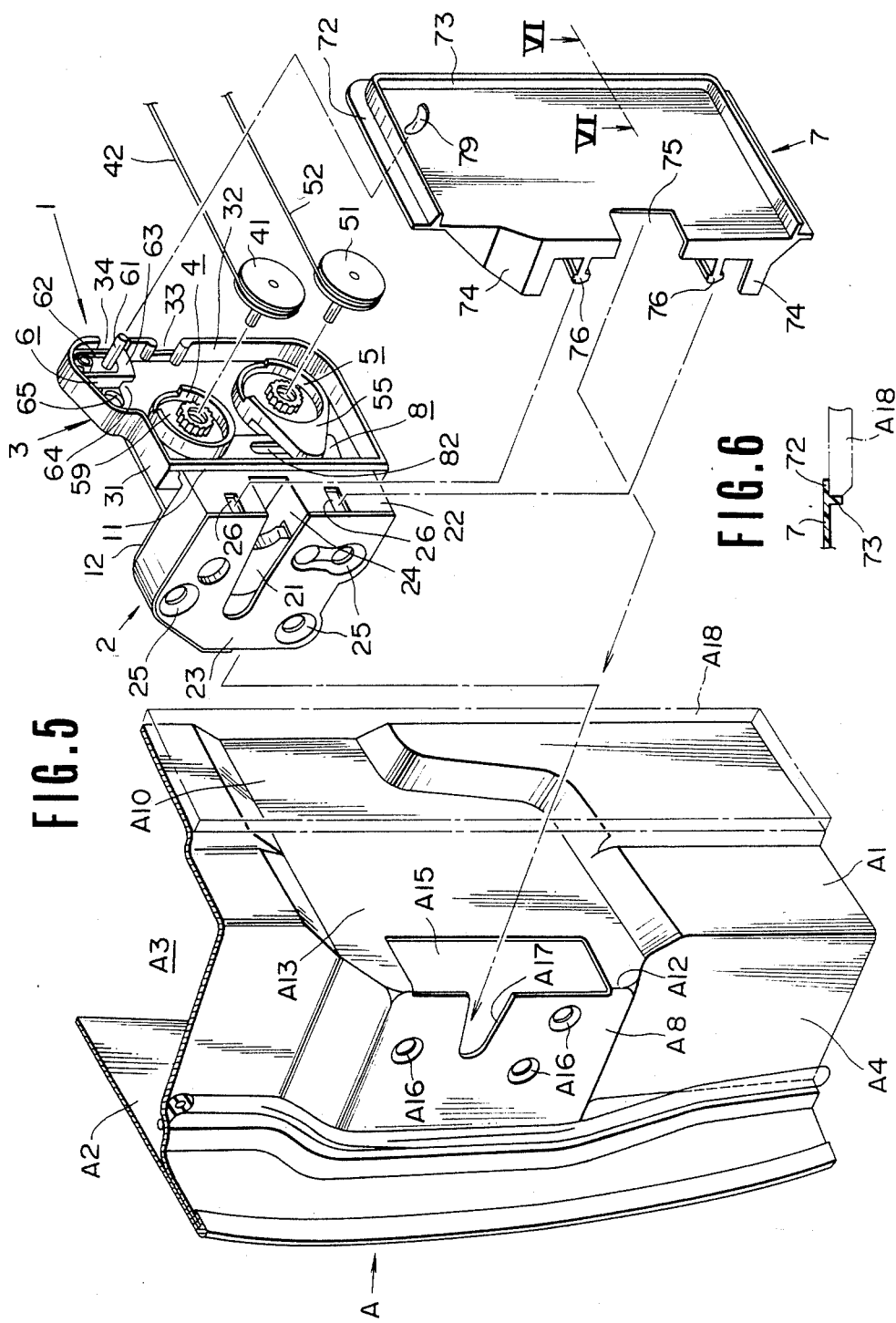

DOOR LATCHING DEVICE

BACKGROUND OF THE INVENTION

The present invention relates in general to a door latching device, and more particularly to a latching device for a door, which is designed to facilitate not only the assembly per se but also the mounting thereof to the door.

SUMMARY OF THE INVENTION

According to the present invention, there is provided an improved door latching device which is employed in an arrangement having a door on which the latching device is mounted, an inside handle mounted on the inboard side of the door and a locking device mounted on the door. The door latching device comprises a latch section including a first casing which contains therein a latch plate and first control means, the first control means being capable of causing the latch plate to assume a non-latched condition, or a full-latched condition; a control section including a casing which contains therein second control means and third control means, the second control means being capable of transmitting the movement of the inside handle to the first control means, the third control means being capable of disabling the second control means from transmitting the movement from the inside handle to the first control means; and hinge means for hingedly connecting the casing of the latch section to the casing of the control section so that the latch section and the control section are openable to assume a substantially flat configuration.

BRIEF DESCRIPTION OF THE DRAWINGS

Objects and advantages of the present invention will become apparent from the following description when taken in conjunction with the accompanying drawings, in which:

FIG. 5 is an enlarged perspective view of the door latching device of the invention and an essential portion of the automotive side door to which the door latching device is to be mounted;

FIG. 6 is a sectional view taken along the line VI—VI of FIG. 5;

BRIEF DESCRIPTION OF A PRIOR ART DOOR LATCHING DEVICE

Prior to describing the door latching device of the invention, one of the conventional door latching devices will be briefly described with reference to FIGS. 1 and 2 in order to clarify the present invention.

Figure 1:
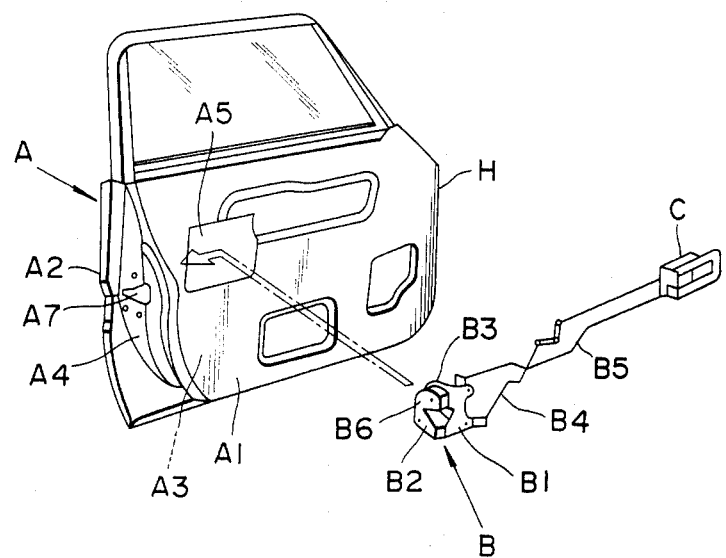
FIG. 1 is a perspective view of an unfinished automotive side door and a conventional door latching device adapted to be mounted in the door.
Figure 2:
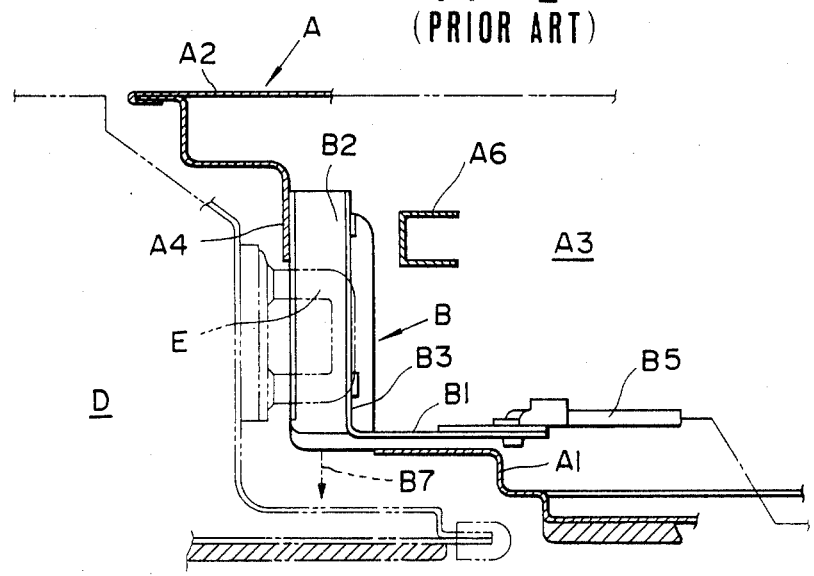
FIG. 2 is an enlarged horizontally sectional view of the door of FIG. 1 at the portion where the conventional door latching device is practically mounted.
Figure 3:
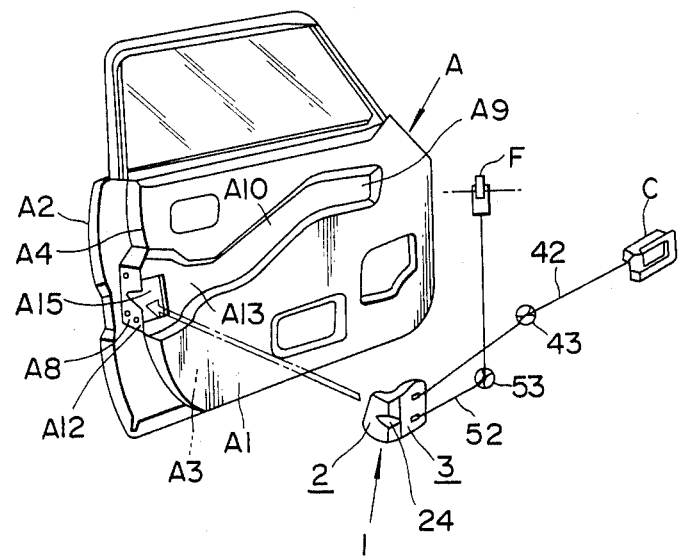
FIG. 3 is a perspective view of an unfinished automotive side door and a door latching device of the present invention which is adapted to be mounted on the door.
Figure 4:
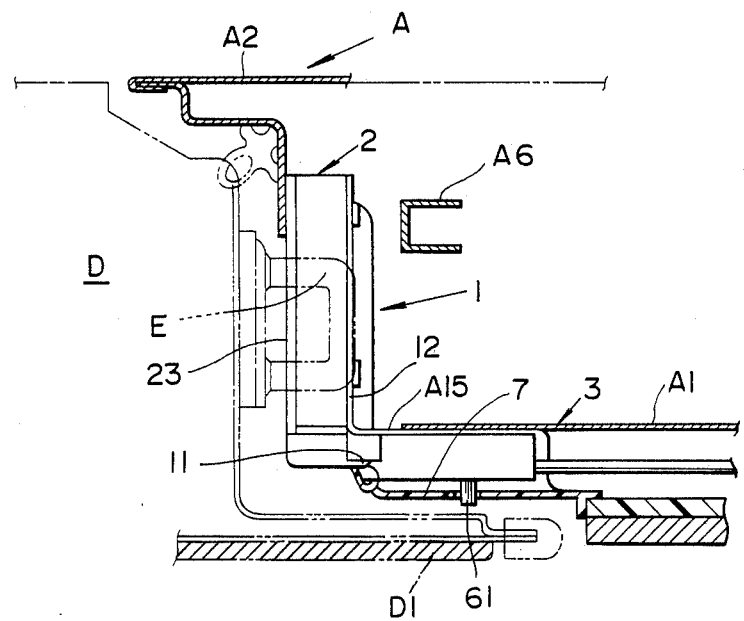
FIG. 4 is an enlarged horizontally sectional view of the door of FIG. 3 at the portion where the door latching device of the invention is practically mounted.

Referring to FIGS. 1 and 2, especially FIG. 1, there is shown an automotive side door A to which the conventional door latching device B is practically applied. The door A is hinged at H to a vehicle body so that the door A is swingable generally horizontally about the hinged portion H thereof. The door A comprises generally an inner panel A1 and an outer panel A2 which are assembled together to form therebetween a parts-mounting space A3. The door latching device B is disposed in the space A3 and secured or bolted to the back side of the trailing edge portion A4 of the door A. For this mounting, the door inner panel A1 is formed with a rectangular opening A5, as is seen in FIG. 1. The door latching device B comprises generally a control section B1 and a latch section B2 which are mounted on the two wing portions of a generally L-shaped base or chassis member B3, as is seen from FIG. 2. The control section B1 is linked to a door inside handle C through two rods B4 and B5.

In assembly, the door latching device B is inserted into the parts-mounting space A3 through the rectangular opening A5, and then moved toward the back side of the trailing edge portion A4 of the door A, avoiding engagement with the window sash A6 (see FIG. 2) mounted in the door A. Following this, the device B is held at the latch section B2 thereof against the back side of the trailing edge portion A4 and then the device B is moved to a right position where a striker receiving recess B6 formed in the latch section B2 is accurately mated with a striker receiving opening A7 formed in the trailing edge portion A4 of the door A. Then, the device B is secured to the trailing edge portion A4 of the door A by means of bolts (not shown) applied from the outside.

As is seen from FIG. 2, a striker E is secured to the vehicle body D with its angularly U-shaped head portion projected into the door opening defined by the vehicle body D. Upon closing of the door A induced by the movement of it in the direction of the arrow B7, the latch section B2 on the door A is brought into engagement with the striker E thereby latching the door A to the vehicle body D.

However, by its inherent construction and arrangement, the door latching device B has several drawbacks which are as follows:

Mounting of the component parts to the generally L-shaped base or chassis member A3 requires troublesome assemblying work. In fact, because of the L-shaped configuration of the base member B3, the assembly of parts to one wing portion of the base member B3 would interfere the other assembly of parts to the other wing portion of the same.

Since the entire construction of the door latching device B is received in the parts-mounting limited space A3 of the door A, the work for linking the control section B1 of the device B to the door inside handle C should be made by stretching operator's hand or hands awkwardly in the space A3. Obviously, this is very troublesome and difficult. Furthermore, in case of trouble with the device B, repair of it should be made by removing the device B from the door A, which is also awkward. Furthermore, a water resistibility of the device B should be severely considered because usually the vehicle door fails to have a adequate watertight construction.

Since transmission of movement from the door inside handle C to the door latching device B is effected by the rods B4 and B5 which are of rigid construction, the work for adjusting operation timing between the inside handle C and the latching device B is very difficult. In fact, many types of rods having different lengthes should be prepared when the device B is applied to vehicle doors having different sizes. Furthermore, when a child proof locking mechanism is set in the device B, it inevitably requires a complicated construction because of the rigidity of the rods B4 and B5.

Therefore, to solve the above-mentioned drawbacks is an essential object of the present invention which will be described in detail hereinnext.

DETAILED DESCRIPTION OF THE INVENTION

Referring to FIGS. 3 to 19 of the drawings, there is shown the present invention. In the following, like parts to those of the above-mentioned conventional device B will be designated by the same numerals and detailed explanation of them will be omitted for facilitation of the description.

As may be understood from FIG. 5, in the assembled condition, the door latching device 1 of the present invention has a generally L-shaped configuration and comprises generally a latch section 2 and a control section 3 which intersect at generally right angles. As will become apparent as the description proceeds, the latch section 2 and the control section 3 are hinged to each other at a hinge portion defined therebetween, and upon assembling, the two sections 2 and 3 are tightly mounted to two wing portions of a generally L-shaped back plate 12. As is seen from FIG. 5, the latch section 2 has a casing 22 containing therein component parts such as a latch plate 21, and a reinforcing cover plate 23 attached to the casing 22 to cover the same. A striker receiving recess 24 is formed in the corresponding portions of the casing 22 and the cover plate 23. While, the control section 3 has a casing 31 containing therein a lock releasing device 4, a locking and unlocking device 5 and a child proof lock lever 6. The latch section 2 and the control section 3 are pivotable to each other about a reduced thickness hinge portion 11 formed therebetween. It is to be noted that the casings 22 and 31 are of a monoblock plastic moulding. However, if desired, as is seen from FIGS. 18 and 19, these two casings 22 and 31 may be separate members which are hingedly connectable with each other. For this hinge connection, each casing 22 or 31 has the following hinge construction. As is best seen from FIG. 19, the casing 31 is formed with two spaced bracket portions 31a each having inwardly projecting stud 31b. Each stud 31b is formed with a small conical projection 31c at its leading end. While, the other casing 22 is formed with small holes 22a at spaced stage portions 22b thereof. Upon assembly of these two casings 22 and 31, the conical projections 31c are pivotally received in the corresponding holes 22a thereby to achieve the hinged connection between the casings.

Figure 9:
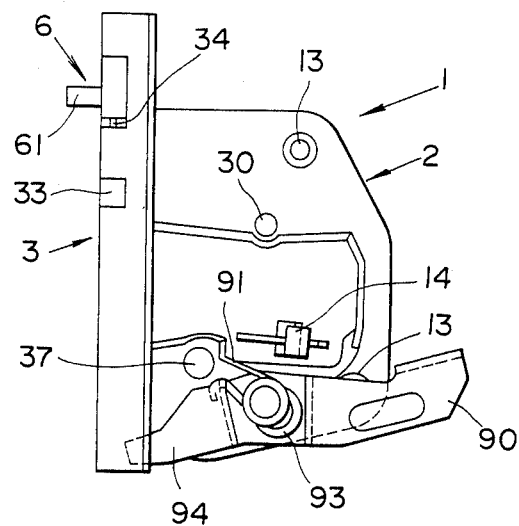
Figure 10:
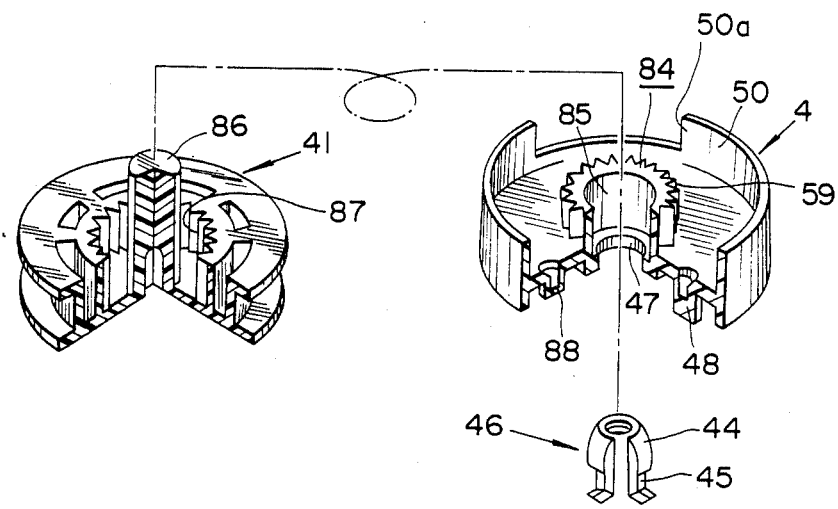
FIG. 10 is a partially broken perspective view of a lock releasing member and a pulley incorporated therewith.

In assembly, the two sections 2 and 3 are secured to the outside faces of the generally L-shaped back plate 12 to form or keep the generally L-shaped configuration of the device 1. Suitable numbers of bolt holes 25 are formed in the latch section 2, each passing through the cover plate 23, the bottom portion of the casing 22 and the associated wing portion of the L-shaped back plate 12. The holes 13 of the back plate 12 are internally threaded, as is seen in FIG. 9. The lock releasing device 4 and the locking and unlocking device 5 are provided with respective pulleys 41 and 51 around which flexible cables 42 and 52 are wound respectively. The cable 42 leads to the door inside handle C through a guide member 43 (see FIG. 3) mounted to the door A, while the other cable 52 leads to the door locking knob F through a guide member 53 mounted to the door A.

As is seen in FIG. 5, the door A is formed at the trailing edge portion A4 with a latching device mounting site which comprises an outwardly protruded stage A8. An elongate depression A10 is formed on the inner panel A1 of the door A, which extends diagonally upwardly from the position of the stage A8 to a position A9 (see FIG. 3) where the inside handle C is to be mounted. As is seen from FIG. 5, the elongate depression A10 is somewhat enlarged at the portion near the stage A8 to form a depressed stage A13 on which, as will be apparent hereinafter, the back side of the control section 3 of the device 1 is mounted through the back plate 12. The depressed stage A13 and the protruded stage A8 define therebetween an angle corresponding to the angle at which the latch section 2 and the control section 3 intersect when tightly mounted on the L-shaped back plate 12. Designated by reference A12 is a ridge line defined between the stages A13 and A8. A rectangular opening A15 is formed in the depressed stage A13 near the ridge line A12. The opening A15 is sized and constructed so that it can smoothly receive therein the latch section 2 of the door latching device 1. The protruded stage A8 is formed with a laterally extending recess A17 merged with the rectangular opening A15. The recess A17 is so formed that it becomes mated with the afore-mentioned striker receiving recess 24 of the latch section 2 when the door latching device 1 is properly mounted to the mounting site of the door A. The protruded stage A8 is formed with suitable numbers of holes A16 (three in the disclosed embodiment), which holes are positioned to mate with the bolt holes 25 of the latch section 2 of the latching device 1 when the device 1 is mounted to the door A. As will be described in detail hereinafter, the door latching device 1 is secured to the mounting site of the door A having the latch section 2 deeply received in the rectangular opening A15 and the control section 3 positioned on the depressed stage A13. For this securing, suitable numbers (three in this embodiment) of screw bolts (not shown) are used, each passing through the hole A16 of the protruded stage A8 and the hole 25 of the cover plate 23 of the latch section 2 which are aligned.

In order to cover the inner mechanism of the control section 3 of the door latching device 1 secured to the door A, a cover plate 7 of plastics is employed which spans across the depressed stage A13. As is best shown in FIG. 5, the cover plate 7 is formed at the periphery thereof with a flange 72 and at the peripheral outer portion thereof with a rib 73. The cover plate 7 is formed, at its left side as viewed in the drawing, with wall portions 74 which cover the front portion of the latch section 2 when assembled to the door A. Furthermore, the cover plate 7 has at the inside portion thereof two retainer projections 76. The projections 76 are engaged, in a snap action manner, with corresponding engaging holes 26 formed in the front side of the casing 22 of the latch section 2 when the cover plate 7 is assembled to the door A. Designated by reference A18 is a door trim member which is attached to the door inner panel A1 to partially cover the elongate depression A10. As is seen from FIG. 6, upon assembly, the right side of the cover plate 7 is tightly mated with the door trim member A18 having the flange 72 and rib 73 thereof engaged with the ridge portion of the trim member A18. The cover plate 7 is formed with a cut 75, which cut is placed on the mouth portion of the striker receiving recess 24 of the latch section 2 when the cover plate 7 is properly assembled to the door A. An arcuate opening 79 is formed in the cover plate 7, through which a handle pin 61 of an aftermentioned child proof locking device 6 passes.

In the following, the construction of the door latching device 1 of the present invention will be described in detail with reference to the drawings, particularly, FIGS. 10 to 13.

Figure 11:
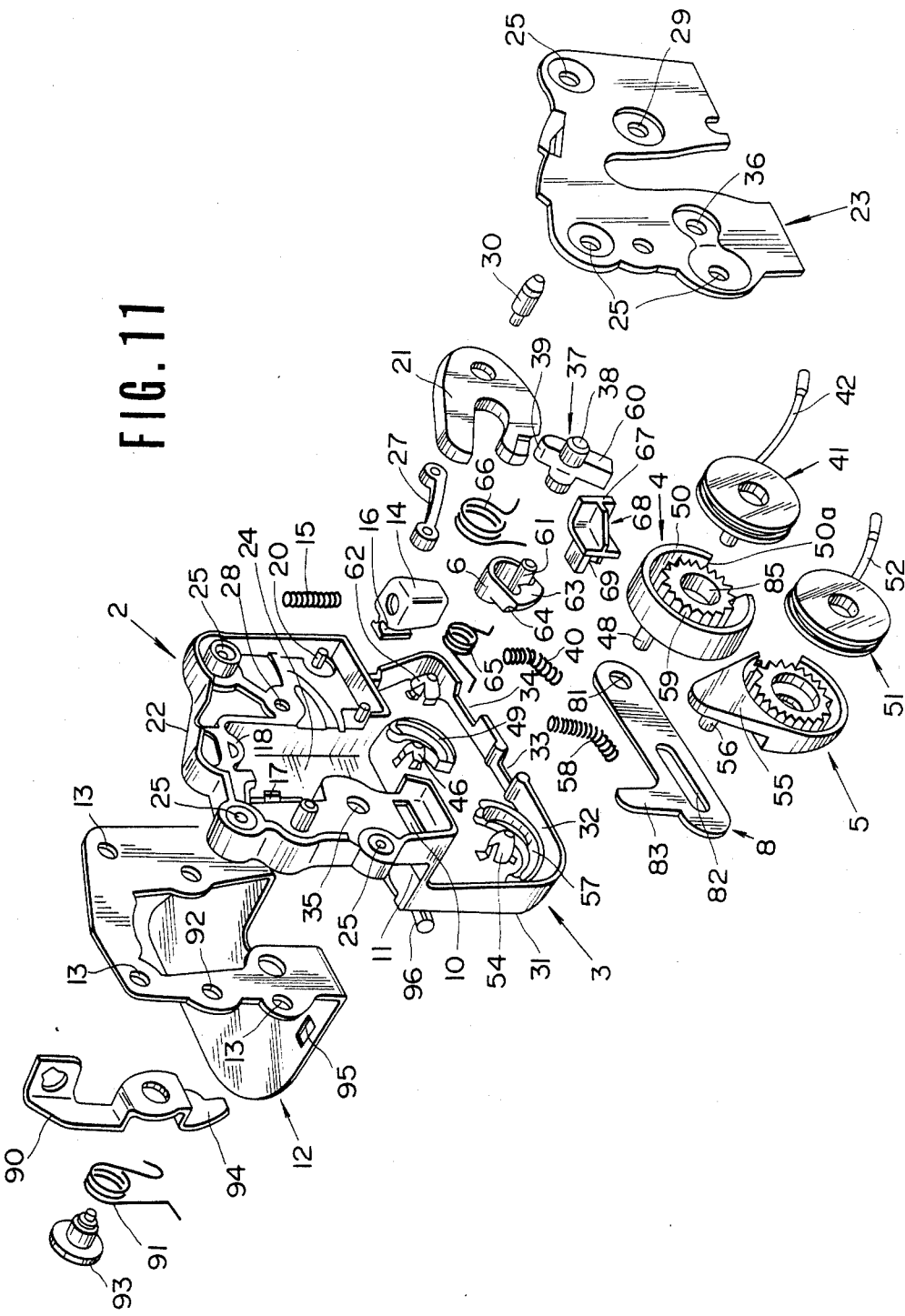
FIG. 11 is an exploded view of the door latching device of the invention.
Figure 12:
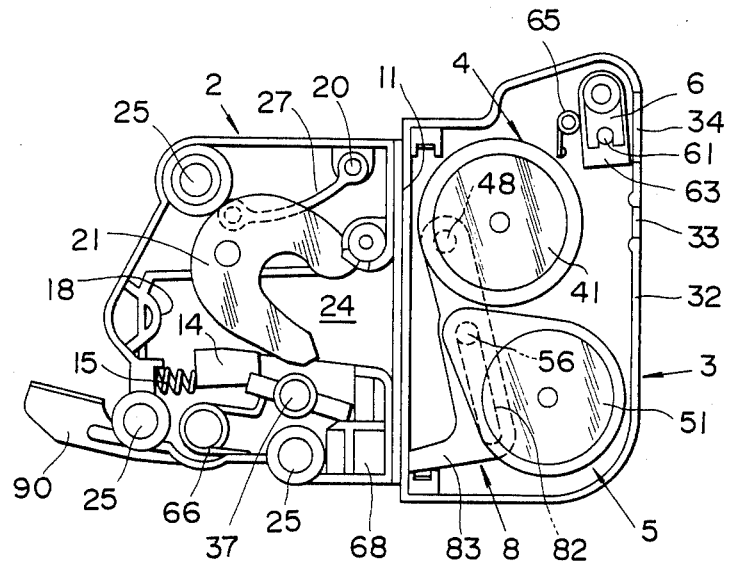
FIG. 12 is a front view of the door latching device assuming a substantially flat configuration.
Figure 13:
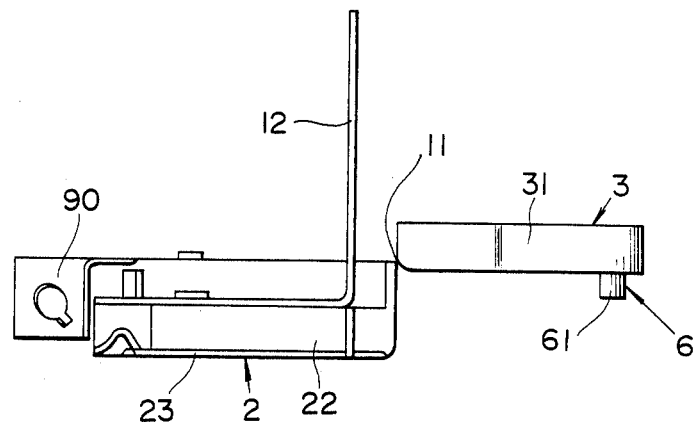
FIG. 13 is a plan view of the door latching device assuming a substantially flat configuration.

First, the control section 3 will be explained. The casing 31 of the control section 3 is formed with a stud 46 which comprises, as well shown in FIG. 10, an enlarged head portion 44 and a reduced neck portion 45. The lock releasing device 4 is rotatably disposed about the stud 46 so that it is rotatable about the axis of the stud 46. As is seen in FIG. 11, additional two studs 54 and 62 having similar construction to the stud 46 are also formed on the casing 31. The locking and unlocking device 5 is rotatably disposed on the stud 54 to be rotatable about the axis of the stud 54, and, the child proof locking lever 6 is pivotally disposed on the other stud 62 to be rotatable about the axis of the stud 62. The lock releasing device 4 is provided at the back portion thereof with an engaging pin 48, and the locking and unlocking device 5 is provided at the back portion of its arm portion 55 with an engaging pin 56. Incorporated with these operation members 4 and 5 is a sub-lever 8 which is formed at its one end an opening 81 and at the other end an elongate opening 82. The engaging pins 48 and 56 of the members 4 and 5 are pivotally and slidably engaged with the openings 81 and 82, respectively. The sub-lever 8 is formed near the elongate opening 82 with a projection 83 which projects toward the latch section 2. The casing 31 is formed at the bottom portion thereof with two arcuate grooves 49 and 57 which extend around the studs 46 and 54, respectively. Within the groove 49 is received a spring 40 which biases the lock releasing device 4 in the counterclockwise direction in FIG. 11 (that is toward its non-releasing position), while, within the other groove 57 is received a spring 58 which biases the locking and unlocking device 5 in the counterclockwise direction, that is toward its unlocking position. The side wall portion 32 of the casing 31 is formed with two cuts 33 and 34 through which aftermentioned two flexible cables 52 and 42 are passed. As is well shown in FIG. 10, the lock releasing device 4 comprises an annular casing having a cylindrical flange 50 and a pulley 41 received in the annular casing. The flange 50 is formed with a cut 50a through with the flexible cable 42 passes. The bottom portion of the annular casing is formed with a center opening 47. A geared ring 84 is coaxially and securedly mounted on the center opening 47 of the annular casing. The ring 84 is formed at its outer surface with axially extending grooves 59 to form an external gear. The center hole 85 of the ring 84 is smoothly curved. The pulley 41 is provided with a center shaft 86 and an internally geared portion 87 which spacedly surrounds the center shaft 86. The sizes of the internal gear 87 and the above-mentioned external gear 59 of the ring 84 are operatively matched so that when assembled together, the pulley 41 can assume any angular rest position relative to the annular casing 4. It is to be noted that the engaging measure between the annular casing 4 and the pulley 41 is not limited to the above-mentioned one. In fact, any kinds of engaging measures can be employed so long as they can provide the pulley 41 with a desired angular rest position relative to the annular casing 4. Similar construction to the above is also applied to the engagement between the locking and unlocking member 5 and the pulley 51. The child proof locking lever 6 is provided with a small arm 63 which extends radially outwardly from the major portion of the lever 6. The leading end of the arm 63 is formed at its back side with a curved recess 64 with which the flexible cable 42 is to be slidably engageable. A turn-over spring 65 is disposed about the lever 6 to bias the arm to a position where it operatively engages with the flexible cable 42. As may be seen from FIGS. 16 and 17, the lever 6 is pivotally movable from a position (FIG. 16) where it operatively engages with the cable 42 to tighten the same to another position (FIG. 17) where it disengages from the cable 42 to slacken the same. As will be understood as the description proceeds, with the cable 42 slackened (FIG. 17), the function of the cable 42 for transmitting the movement of the door inner handle C to the door latching device 1 is cancelled. As is understood from FIG. 4, the position where the handle pin 61 for handling the child proof locking lever 6 is located is such as to be totally inaccessible when the door A is closed. In the disclosed embodiment, the handle pin 61 becomes placed behind the edge portion D1 of the vehicle body D when the door A is closed.

Now, the latch section 2 will be described. As is seen in FIG. 11, a generally U-shaped latch plate 21 is pivotally supported by a pin 30 which spans between a hole 28 formed in the casing 22 and a hole 29 formed in the reinforcing cover plate 23. A plate spring 27 extends between a stud 20 of the casing 22 and the latch plate 21 to bias the latch plate 21 toward the striker receiving recess 24. At the position opposite to the latch plate pivoting portion with respect to the striker receiving recess 24, a pawl member 37 is arranged which is pivotally supported by its shaft portion 38 spanning between an opening 35 of the casing 22 and an opening 36 of the reinforcing cover plate 23. The pawl member 37 is formed with two projections 39 and 60 which radially extend in the opposite directions from the shaft portion 38, the projection 39 being engageable with fork portions of the latch plate 21 to retain the plate. A coil spring 66 is connected to the pawl member 37 to bias the same clockwise in FIG. 12, that is, in a direction to retain the latch plate 21. A slider 68 is arranged to actuate the pawl member 37, more particularly, the projection 60 of the pawl member 37. The slider 68 is formed with an engaging portion 67 which is engageable with the projection 60, and a grooved projection 69 which is slidably received in an elongate opening 10 formed in the casing 22 near the opening 35. The projection 83 of the afore-mentioned sublever 8 is engageable with the grooved projection 69 of the slider 68 to slide the slider in a given direction. A wedge-shaped elastic bumper 14 is received in the striker receiving recess 24 and biased in a downward direction (as viewed in FIG. 11) by a spring 15. For achieving sliding movement of the bumper 14 in the recess 24, the bumper 14 is formed with a guide portion 16 which is slidably engaged with an elongate opening 17 formed in the casing 22 at the recess 24. The innermost portion of the recess 24 forms a stopper 18 against which the after-mentioned striker E may collide. By the provision of the bumper 14, the insertion of the striker E into the recess 24 is quietly achieved. On the back of the casing 22 of the latch section 2, there is tightly mounted the L-shaped back plate 12. An outside lever 90 is pivotally connected to the back plate 12 through a pin 93 which passes through both an opening (no numeral) of the lever 90 and an opening 92 of the back plate 12. The lever 90 is biased clockwise (as viewed in FIG. 11) by a coil spring 91. One end 94 of the lever 90 is engageable with the projection 83 of the lever 8. The other end portion of the lever 90 is connected to a door outside handle (not shown) through a known linkage.

One wing portion (lower one in FIG. 11) of the back plate 12 is formed with an opening 95 to which an engaging projection 96 formed on the back side of the casing 31 of the control section 3 is latched when the latch section 2 and the control section 3 are fully assembled on the back plate 12.

Figure 14:
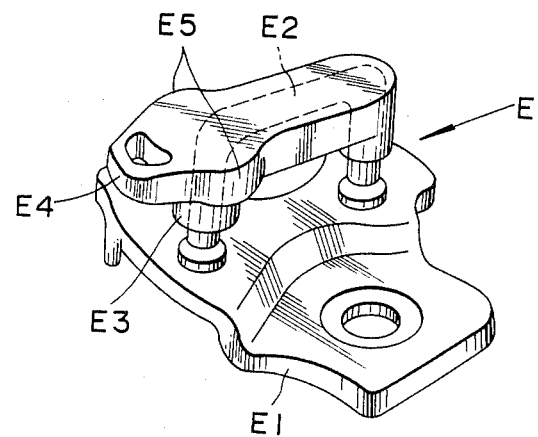
FIG. 14 is a perspective view of a striker employed in the invention.

As is shown in FIG. 14, the striker E mounted to the vehicle body D comprises a base plate E1 directly fitted to the vehicle body D, an angularly U-shaped member E2 projecting from the base plate E1, and a plastic cover moulded on the U-shaped member E2. The cover comprises an annular portion E3 disposed about one shank portion of the member E2, a deformable stopper portion E4, and a laterally expanded portion E5. As will be clear hereinafter, upon engagement of the striker E with the door latching device 1, the annular portion E3 engages with the latch plate 21, the stopper portion E4 engages with the innermost portion (18, stopper) of the striker receiving recess 24, and the expanded portion E5 engages with the bumper 14 in the recess 24. With this construction, the latching engagement between the door A and the vehicle body D can be made without producing undesirable noise.

The door latching device 1 per se is assembled in the following steps. First, as is seen from FIG. 11, the casing 22 of the latch section 2 and the casing 31 of the control section 3 are opened about the hinge portion 11 to assume a substantially flat configuration. Then, the component parts of the device 1 are mounted to the corresponding casings 22 and 31. The L-shaped back plate 12 and the reinforcing cover plate 23 are then secured to the casing 22 with the component parts contained in the casing 22. Then, the control section 3 thus assembled is turned clockwise (as viewed in FIG. 11) about the hinge portion 11 to a position where the engaging projection 96 of the casing 31 is snugly mated with the opening 95 of the back plate 12. With this, the assembled door latching device 1 has a generally L-shaped configuration as shown in FIG. 5.

The assembly of the assembled door latching device 1 to the door A is carried out generally in the following steps. First, as is seen from FIG. 5, the assembled door latching device 1 is brought to the mounting site of the door, inserting the latch section 2 thereof through the opening a15 in the interior space A3 of the door A. The device 1 is then moved to a proper position where the bolt holes A16 of the protruded stage A8 and the bolt holes 58 of the latch section 2 are accurately mated with each other. Then, three connecting bolts (not shown) are passed through the mated holes and tightly screwed to the corresponding threaded holes 13 of the back plate 12. With this, the assembled latching device 1 is tightly mounted to the door A. Then, the leading end of the flexible cable 42 wound on the pulley 41 is connected to the door inside handle C, and then, when the thread 42 is not adequately stretched, the pulley 41 is removed from the casing of the lock releasing device 4 and turned about the axis thereof several times to shorten the length of the cable 42 from the pulley 41 to the door inside handle C. Then, the pulley 41 is mounted to the casing of the lock releasing device 4 with the thread 42 kept stretched. By employing similar assembling steps to the above, the other flexible cable 52 is spanned tightly between the locking and unlocking device 5 to the door locking knob F. Then, the rectangular cover plate 7 is placed on the control section 3 having the handle pin 61 of the child proof locking lever 6 passed through the arcuate opening 79 of the cover plate 7. Then, the cover plate 7 is pushed permitting the engaging projections 76 of the plate 7 to be snugly engaged with the openings 26 of the latch section 2. With these steps, the door latching device 1 and the cover plate 7 are neatly assembled to the mounting site of the door A.

In the following, operation of the door latching device 1 will be described with reference to the drawings.

Figure 16:
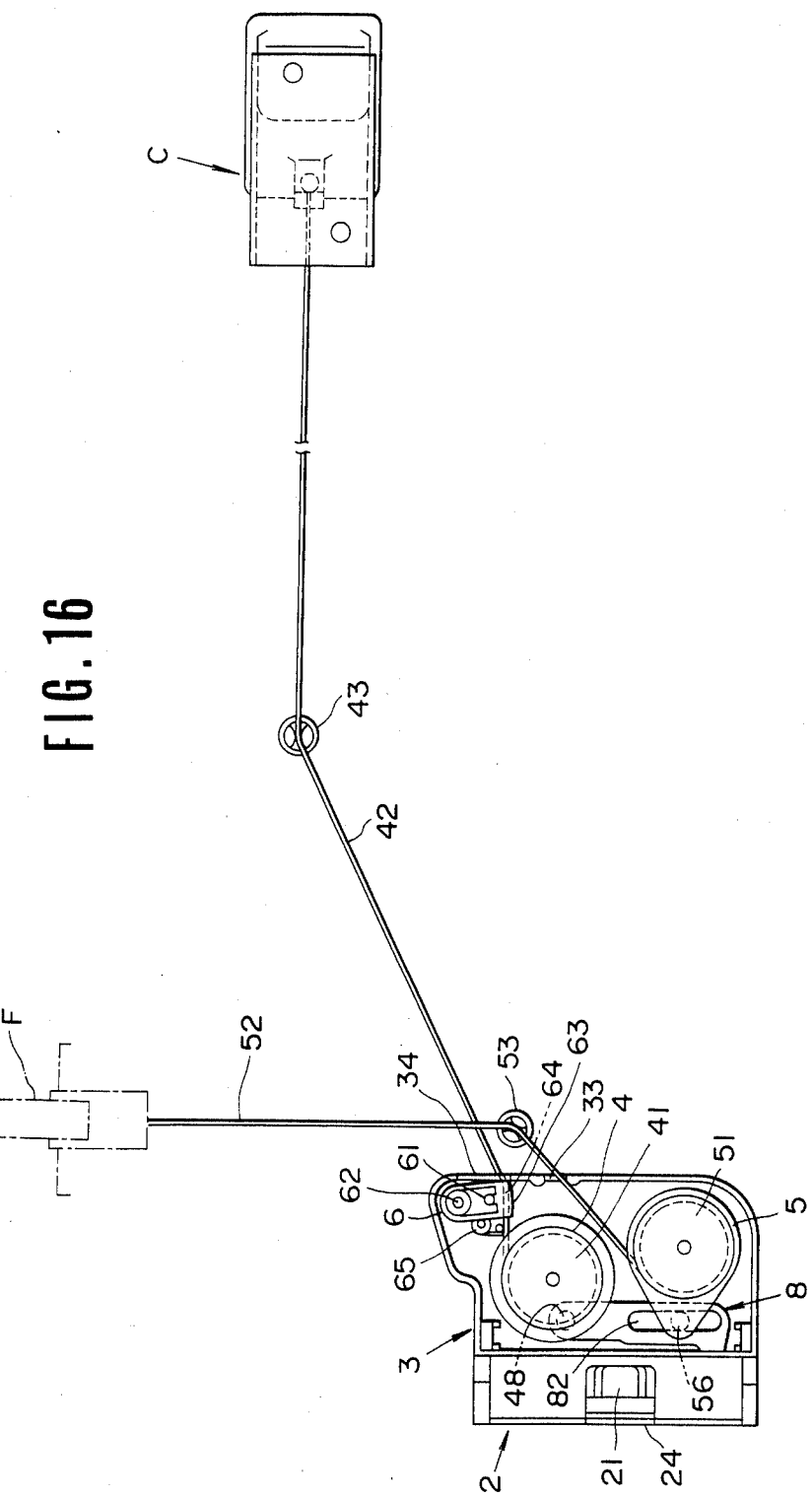
FIG. 16 is a front view of the door latching device of the invention incorporated with a door locking knob and a door inside handle and showing an inoperative condition of a child proof locking mechanism.

For ease with which the explanation can be made, the following description will be commenced with respect to an unlocked condition of the device 1 as shown in FIGS. 5 and 16. In this condition, the projection 83 of the sub-lever 8 is protruded into the casing 22 of the latch section 2 and assumes a position wherein it is operatively engageable with either the grooved projection 69 of the slider 68 or the end 94 of the outside lever 90.

When, under this condition, the locking knob F is handled to pull the flexible thread 52, the pulley 51 and the locking and unlocking device 5 are turned in the clockwise direction as viewed in FIG. 16, causing the pin 56 of the device 5, which is slidably engaged with the elongate opening 82 of the sub-lever 8, to turn in the same direction. Thus, the sub-lever 8 is pivoted about the pin 48 of the lock releasing device 4 in the counterclockwise direction as viewed in FIG. 16 causing the projection 83 to be drawn from the latch section 2. Thus, under this condition, the projection 83 is completely disengaged from both the grooved projection 69 of the slider 68 and the end 94 of the outside lever 90 permitting the device 1 to assume its locked condition. This condition may be understood from FIG. 12. For clarification of the positional relationship between the component parts in this locked condition, the drawing is shown with latch section 2 and the control section 3 opened to assume a flat configuration. Under this locked condition, even when the lock releasing device 4 is turned to move the sub-lever 8 in response to operation of the door inside handle C, the movement of the sub-lever 8 is not transmitted to the slider 68. By the same reason now described, even when the outside handle is operated, the outside lever 90 strikes air.

Figure 7:
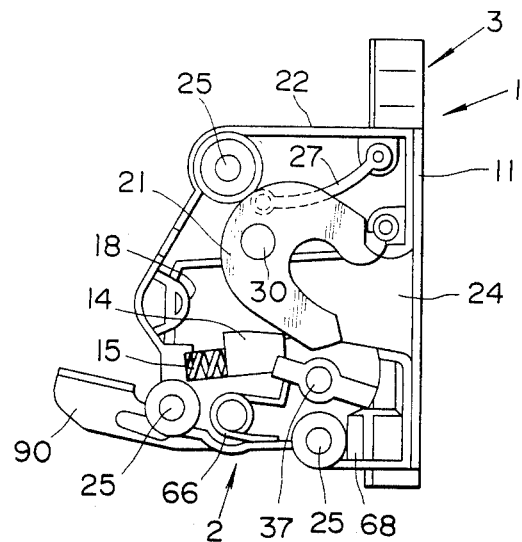
FIGS. 7, 8 and 9 are front, plan and back views of the door latching device of the invention, respectively.
Figure 8:
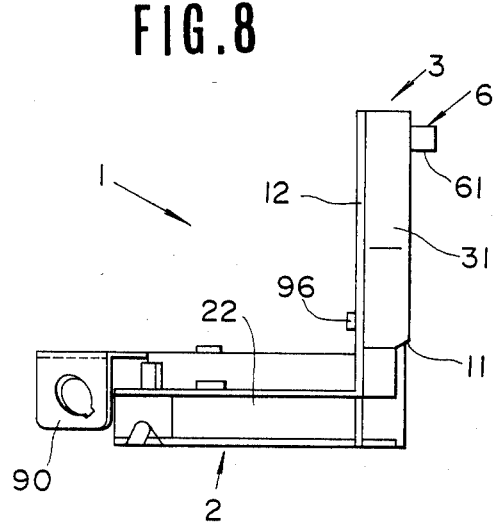
Figure 15:
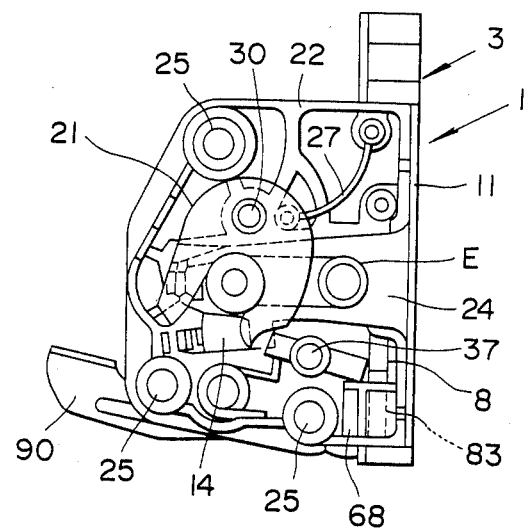
FIG. 15 is a front view of the door latching device of the invention in the state wherein it engages with the striker.

FIGS. 5 and 7 show a condition wherein the latch plate 21 is ready for catching the striker E. When the striker E is inserted from the right in FIG. 7 into the striker receiving recess 24 of the latch section 2 and pushes the exposed fork portion thereof, the latch plate 21 is turned about the pin 30 in the clockwise direction in FIG. 7 and the projection 39 of the pawl member 37 catches or locks the leading end of the other fork portion of the latch plate 21. With this, the annular portion E3 of the striker E is caught by the latch plate 21, as is seen in FIG. 15. In this full-latched condition, the stopper portion E4 of the striker E engages with the innermost stopper portion 18 of the striker receiving recess 24 of the latch section 2, and the expanded portion E5 of the striker E is held by the wedge-shaped bumper 14. If the insertion of the striker E into the recess 24 is not adequately strong, the device 1 assumes a half-latched condition wherein the normally exposed fork portion of the latch plate 21 engages with the projection 39 of the pawl member 37.

When, under the full-latched condition wherein the striker E is fully latched as is shown in FIG. 15 and the sub-lever 8 assumes its operative position as shown in FIG. 16 that is, (an unlocked condition of the door latching device 1), the door inside handle C is handled to pull the flexible cable 42, the lock releasing device 4 and the associated pulley 41 are turned together in the clockwise direction in FIG. 16 turning the pin 48 of the device 4 in the same direction. Thus, the sub-lever 8 is moved upward in FIG. 16 causing the projection 83 thereof to move the slider 68 upward in FIG. 15. Thus, the engaging portion 67 of the slider 68 pushes the projection 60 of the pawl member 37 turning the same in the counterclockwise direction in FIG. 15. With this, the projection 39 of the pawl member 37 is disengaged from the latch plate 21, so that the latched condition of the latch plate 21 is released.

Figure 17:
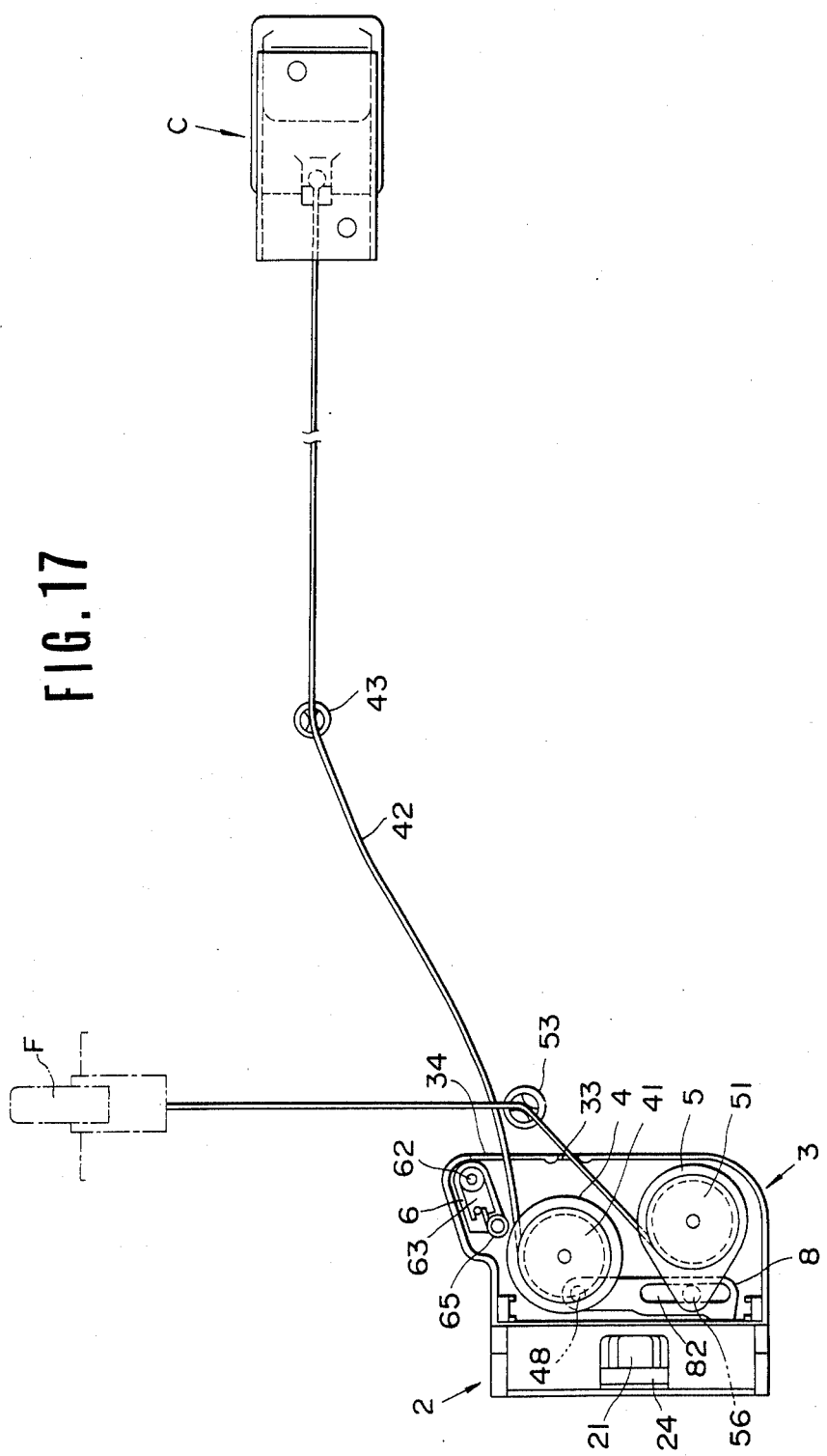
FIG. 17 is a view similar to FIG. 16, but showing an operative condition of the child proof locking mechanism.
Figure 18:
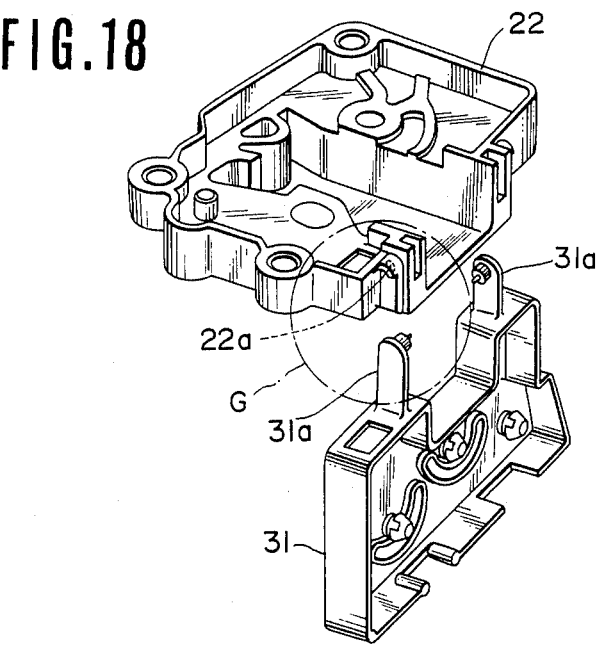
FIG. 18 is a perspective view of separate casings hingedly connectable with each other, which are employable in the present invention.
Figure 19:
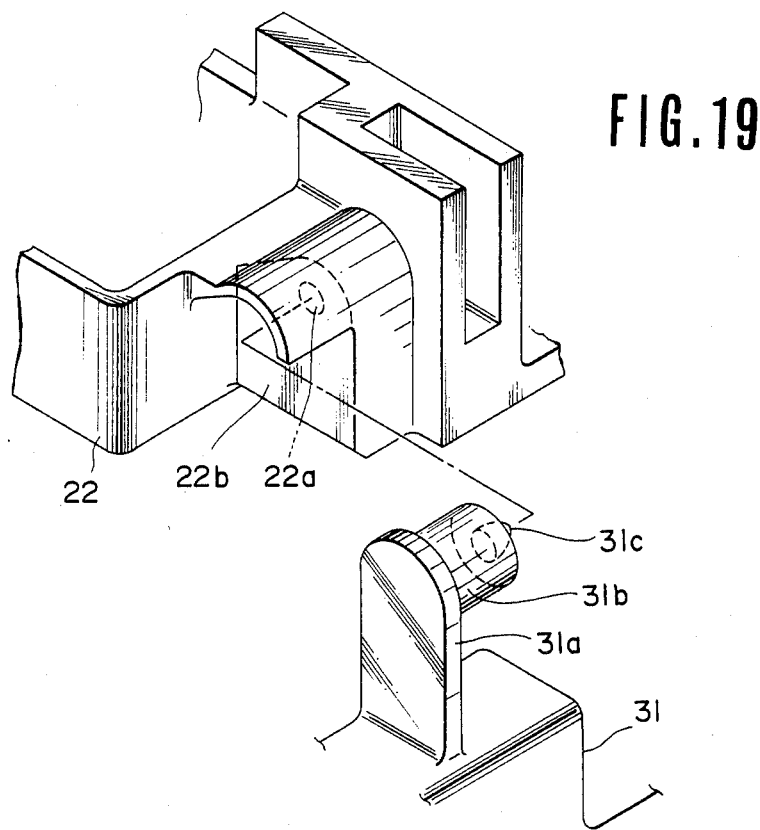
FIG. 19 is an enlarged perspective view of the portion enclosed by the circle G of FIG. 18.

In the following, the operation of the child proof locking mechanism will be described with reference to FIGS. 16 and 17. FIG. 16 shows an inoperative condition of the mechanism wherein the child proof locking lever 6, (more particularly, the curved recess 64 of the arm 63), is in engagement with the flexible cable 42 to stretch the same. In this condition, the movement of the door inside handle C is assuredly transmitted to the door latching device 1. When the lever 6 is turned to the position shown in FIG. 17 and keeps this position by the function of the turn-over spring 65, the curved recess 64 of the arm 63 is disengaged from the flexible cable 42 causing the same to be slackened. When, under this condition, the door inside handle C is handled to pull the cable 42, the slack thus produced on the cable 42 absorbs the movement of the handle C thereby preventing the movement transmission from the handle C to the device 1. Thus, under this, the latched condition of the latch plate 21 is not released even when the inside handle C is operated by, for example, a child. However, even under this child proof locking condition, the latch plate 21 becomes unlatched when the door outside handle (not shown) is handled because the movement transmission from the outside lever to the device 1 is effected through the outside lever 90 without being affected by the slack of the flexible cable 42.

As will be understood from the above description, in accordance with the present invention, the following advantages are provided by its unique construction and arrangement.

(a) As the door latching device 1 of the invention is generally composed of two hingedly connected sections (viz., latch section 2 and control section 3), the assembly of the device per se can be carried out with the two sections opened to assume a substantially flat configuration. This flat configuration facilitates the mounting of parts to the casing because only simple movements of parts are required and thus lends itself to assembly by automatic assembling devices.

(b) Mounting of the door latching device 1 to the door A is easily achieved, because, unlike the case of the conventional device of FIGS. 1 and 2, the device is mounted on the outside of the door inner panel A1. This also facilitates the use of automatic assembling devices.

(c) Since the control section 3 of the device 1 is mounted on the outside of the door inner panel A1, adjustment and repare of the parts in that section can be made without the need to remove the device 1 per se from the door A.

(d) As the length of the flexible cable 42 (or 52) leading to the door inside handle C (or door locking knob F) can be easily adjusted to a desired degree in the aforementioned simple manner, the door latching device 1 of the invention is widely applicable to various types of doors having different sizes.

(e) As the child proof locking mechanism 6 incorporated with the door latching device 1 of the invention is so constructed as to skillfully use the flexibility of the flexible cable 42 leading to the door inside handle C, the child proof locking mechanism 6 can be simple in construction.

What is claimed is:

1. In an arrangement having a door, a door latching device mounted on said door to latch the same to a fixed member, an inside handle mounted on an inboard side of said door, for producing a first movement, and for releasing said latching device when handled, and a locking device mounted on said door for locking said latching device when handled, said door latching device comprising:

a latch section including a first casing having a backside and containing therein a latch plate and first control means for causing said latch plate to assume a first nonlatched condition and a second full-latched condition;

a control section including a second casing having a back side and containing therein second control means and third control means, said second control means comprising means for transmitting the movement of said inside handle to said first control means, said third control means comprising means for disabling said second control means from transmitting the movement from said inside handle to said first control means; and hinge means for hingedly connecting the casing of said latch section to the casing of said control section so that said latch section and said control section are openable to assume a substantially flat configuration.

2. The door latching device as claimed in claim 1, in which said hinge means is integrally connected to both said first and second casings so that said first and second casings are of a monoblock construction.

3. The door latching device as claimed in claim 2, wherein the monoblock construction comprises a wall portion, and comprises plastics.

4. The door latching device as claimed in claim 3, wherein the hinge portion comprises a reduced thickness compared with a thickness of the wall portion of said monoblock construction.

5. The door latching device as claimed in claim 1, wherein said first and second casings are separate members which are hingedly connectable with each other by said hinge means.

6. The door latching device as claimed in claim 5, wherein said hinge means comprises two outwardly facing holes formed in said first casing, and two inwardly projecting members formed on said second casing, said projecting members being respectively and pivotally received in said holes, and arranged to hingedly connect said first and second casings.

7. The door latching device as claimed in claim 1, further comprising a generally L-shaped chassis plate comprising two wing portions having outsides, wherein the back side of said first casing and the back side of said second casing are respectively mounted on the outsides of said wing portions so that said latch section and said control section on said chassis plate define therebetween generally right angles.

8. The door latching device as claimed in claim 7, wherein said first control means comprises:
a pawl member having first and second projections rotatable together, said first projection being engageable with said latch plate to cause the latch plate to assume the second full-latched condition; and
a slider having first and second portions movable together, said first portion being engageable with said second projection of said pawl member and being for actuating the second projection when said slider moves in a first given direction, said second portion being actuated by said second control means.

9. The door latching device as claimed in claim 8, wherein said second control means comprises:
a first cable adjusting device having a first associated flexible cable, disposed in said second casing and rotatable about the center portion thereof, said device being rotatable in a second given direction when the door inside handle is operated; and
a sub-lever having one end pivotally connected to said first cable adjusting device so that when said adjusting device is rotated, said lever is moved in a third given direction, said lever having a projection which is engageable with said second portion of said slider so that when said lever is moved in the third given direction, said projection moves said slider and the slider moves said pawl member.

10. The door latching device as claimed in claim 9, wherein said third control means comprises:
a second cable adjusting device having a second associated flexible cable, having a major portion, disposed in said second casing and rotatable about the center portion thereof, said device being rotatable in a fourth given direction when the locking device is operated;
means for converting the rotational movement of said second cable adjusting device to a pivotal movement of said sub-lever, so that when said second cable adjusting device is rotated by a given degree, said sub-lever is pivoted about said pivoted end thereof in a direction to cause said projection of said sub-lever to disengage from said slider.

11. The door latching device as claimed in claim 10, wherein said first cable adjusting device includes a pin, said pin being pivotally disposed in an opening formed in an end portion of said sub-lever, so that said sub-lever is pivotal about said pin.

12. The door latching device as claimed in claim 11, wherein said means for converting the rotational movement of said second cable adjusting device to the pivotal movement of said sub-lever comprises:
a pin connected to said second cable adjusting device; and
an elongate slot formed in said sub-lever near the projection of the sub-lever, said pin being slidably received in said elongate slot.

13. The door latching device as claimed in claim 12, wherein said pin of the second cable adjusting device is provided on an arm portion which extends radially outwardly from said major portion of said second cable adjusting device.

14. The door latching device as claimed in claim 13, further comprising biasing means for biasing each of said first and second cable adjusting devices in a direction to pull said associated flexible cables.

15. The door latching device as claimed in claim 14, wherein each of said first and second cable adjusting devices comprises:
an annular casing having a central bore in which a stud formed in the corresponding casing is passed;
an externally geared ring secured to said annular casing to be coaxial with said central bore; and
a pulley having a center shaft and an internally geared cylindrical wall which spacedly surrounds said center shaft, the external gear on the ring being matched with the internal gear on said cylindrical wall, said pulley winding thereon one of said first and second associated flexible cables, wherein each of said cables leads to one of said door inside handle and said locking device.

16. The door latching device as claimed in claim 10, wherein said first and second cable adjusting devices are respectively connected to said door inside handle and said locking device through said first and second respective flexible cables.

17. The door latching device as claimed in claim 16, further comprising a child proof locking mechanism provided for the first flexible cable, and associated with said first cable adjusting device, so that when said child proof locking mechanism is in an operative condition, movement of said inside handle is not transmitted to said first cable adjusting device.

18. The door latching device as claimed in claim 17, wherein said child proof locking mechanism comprises:
a second lever pivotally connected to said second casing, said second lever being for assuming a first position wherein said lever is in slidable contact with said first flexible cable to tighten the first flexible cable, and a second position wherein said lever is disengaged from said first flexible cable thereby producing a slack in the first cable; and
means for biasing said second lever in either one of said first and second positions.

19. The door latching device as claimed in claim 18, further comprising an outside third lever pivotally connected to said L-shaped chassis plate, one end of said third lever being connected to a door outside handle on the door, the other end of said third lever being engageable with said projection of said sub-lever, so that when said outside handle is operated, said outside lever is pivoted in a fifth given direction causing the other end of said lever to move said sub-lever in a direction to move said pawl member.

* * * * *